United States Patent Office 2,823,591
Patented Feb. 18, 1958

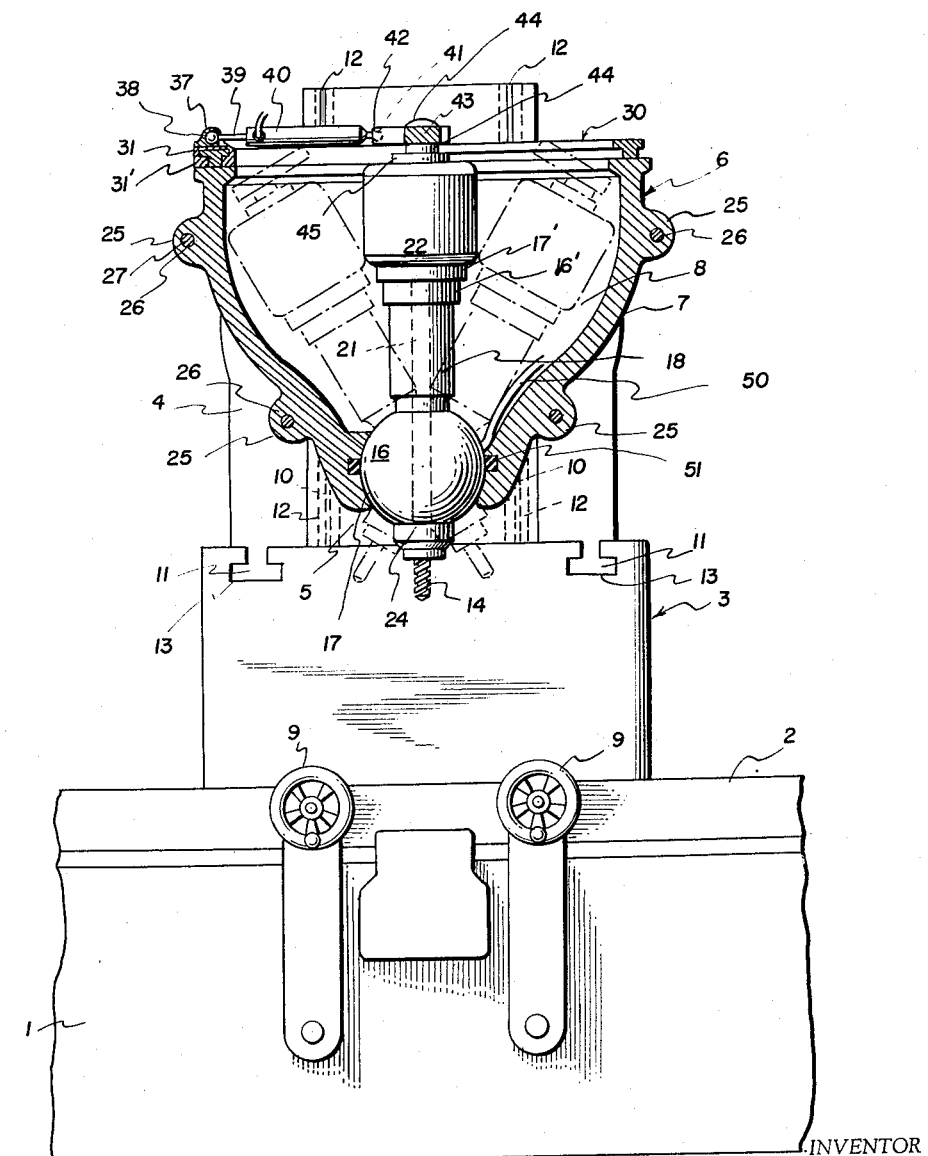

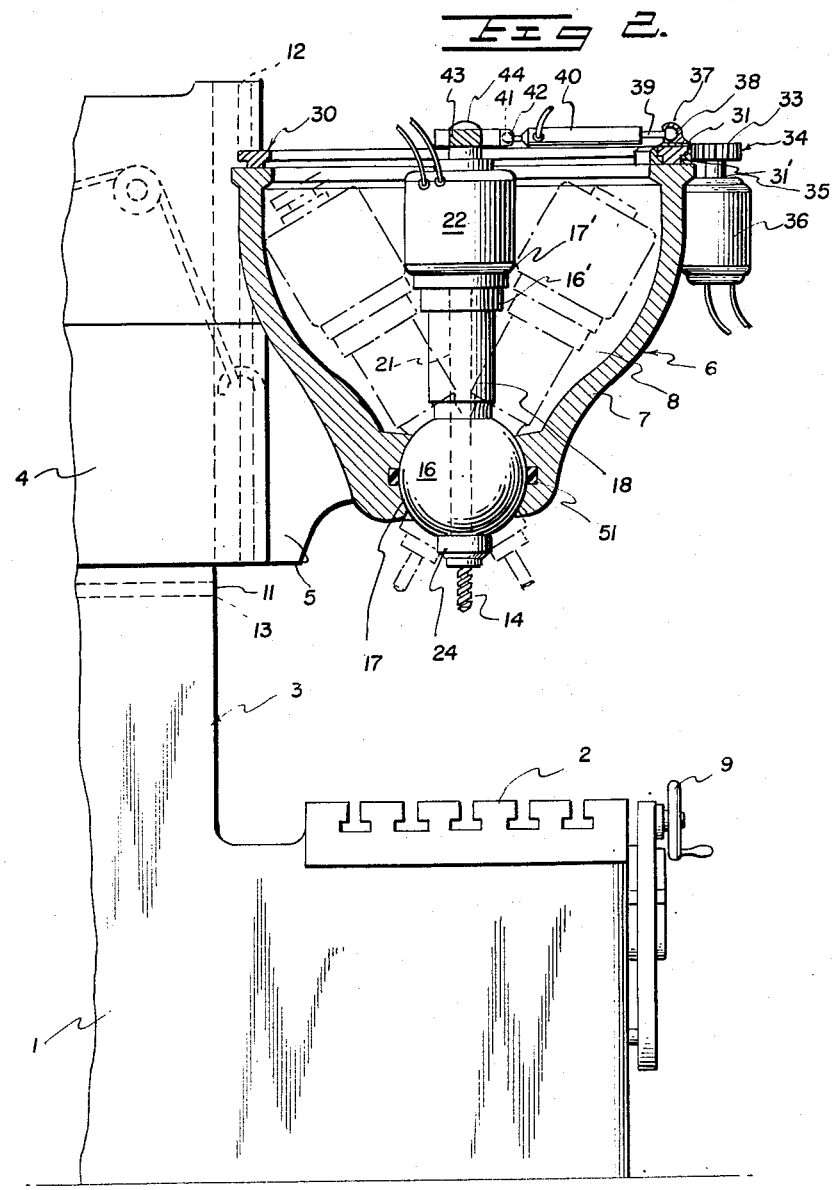

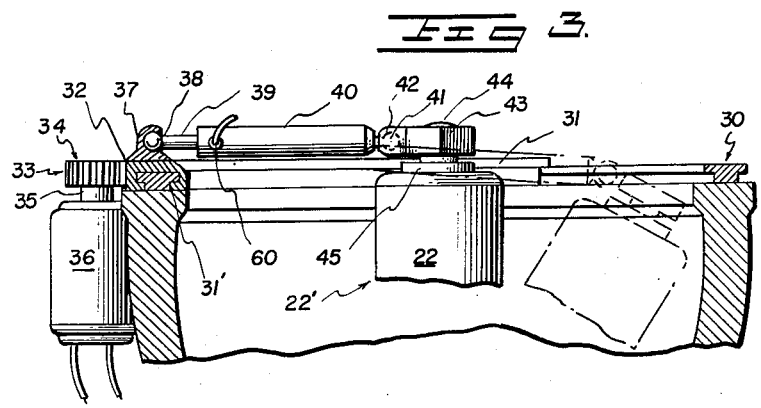
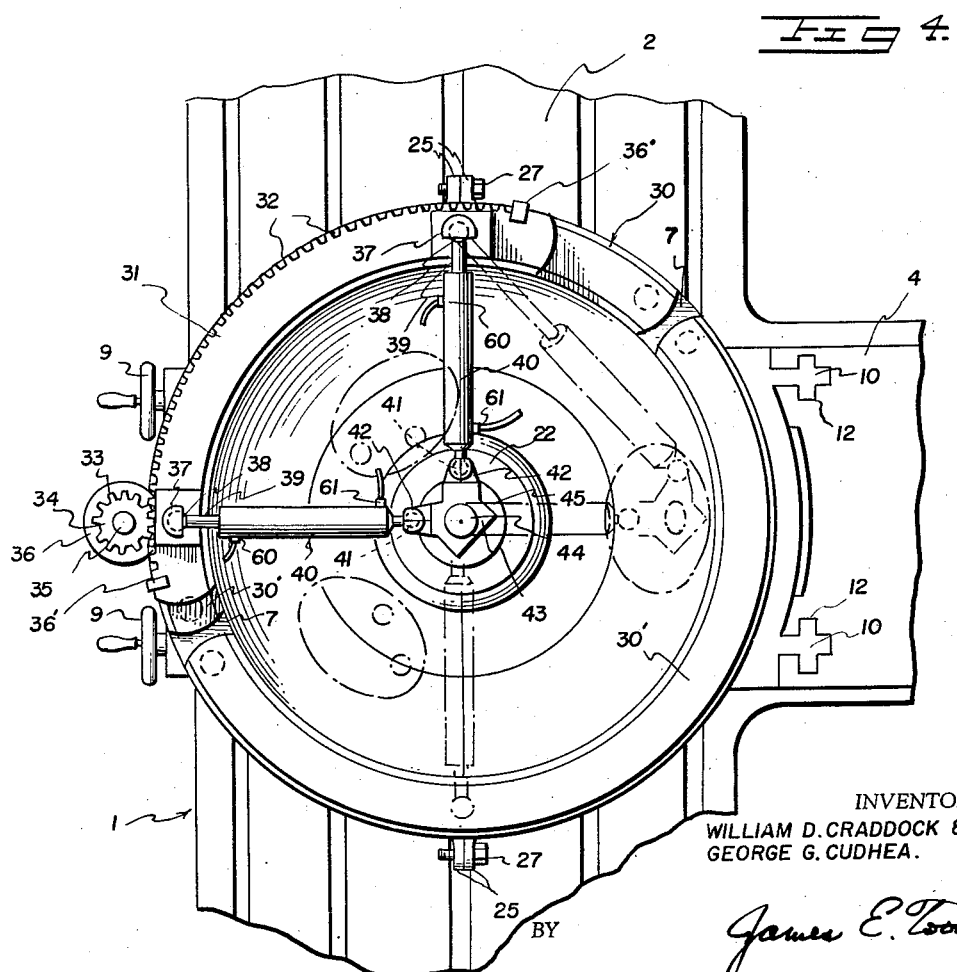

2,823,591

TOOL ADJUSTMENT

William D. Craddock, Philadelphia, and George G. Cudhea, Morrisville, Pa., assignors to Kaiser Metal Products, Inc., Oakland, Calif., a corporation of California Application November 13, 1953, Serial No. 391,906

11 Claims. (Cl. 90—15)

This invention relates to milling machines. More particularly, it is concerned with providing a novel arrangement for attaching the cutting or work performing element of a milling machine to the machine head so as to obtain the maximum amount of overall adjustment of the cutting element with respect to the work during the machining of the same.

Milling machines as generally used in the art are adapted to remove metal from work by means of a revolving milling cutter as the work is fed against the same. The milling cutter is usually mounted in or on an arbor or spindle, where it is held in place by suitable spacers, bushings, or other securing means. Although the device of the instant invention is particularly adapted for use with a vertical spindle type milling machine, such as a "Hydro-Tel" type of milling machine, where the spindle and table for holding the work are located in substantially the same vertical plane, with the cutter or work performing element being affixed to the spindle, it is to be understood it is also readily adaptable for use with other milling machines, such as a horizontal plain milling machine, universal milling machines, etc.

In the vertical spindle milling machine, the spindle, as well as the cutter, generally have a vertical movement while the table on which the work is mounted usually has vertical, longitudinal and transverse movements. Thus, it may be said that movement of the work with respect to the cutting device, or of the cutting device with respect to the work, can be had in three different directions. In short, it may be said that in conventional milling machines of the vertical spindle type, the cutting element has but three freedoms of motion.

However, in some articles that are machined on a vertical spindle type milling machine, it is highly desirable to obtain both a fourth and fifth freedom of movement, or a rotational and angular adjustment of the cutting device with respect to the work, in addition to the other three movements. In certain milling jobs, the cutter should move not only in a vertical as well as a horizontal plane with respect to the work, but in addition, a circulatory motion is also required, as for example, when a circular or annular T-slot is cut in an article. It is normally impossible to obtain this circulatory motion in the cutters presently used with conventional milling machines because of the way they are attached to the milling machine head, unless different special auxiliary attachments are used, one for circular milling, and one for angular milling.

For example, even in the so-called universal milling attachments, which are commonly employed today with various milling machines, such as a vertical spindle milling machine, wherein the spindle and cutter can be set at an angle with respect to both the vertical and horizontal planes of the cutter, once the spindle and cutter have been set and adjusted at a predetermined angle, they remain fixed. It is not possible to obtain a circulatory motion of the cutter itself through an arc of 360°. Consequently, in cases where rotation of the cutter with respect to work is desired, it is customary to employ, even with the universal milling attachment for the spindle and cutter, a variety of rotary attachments or fixtures which are ordinarily affixed directly to the work table or the platen of the machine. These rotary attachments are used on a variety of circular milling, such as in making circular T-slots, segment outlines, etc., and on a great many tool and die making jobs that require splining, slotting or irregular form milling. These attachments are graduated on the circumferences of the tables, and they are usually adjusted by hand in various ways, in order to revolve the work in the proper manner with respect to the cutter. This requires the use of two separate attachments and thus enhances the possibility of error during the adjustment of the same.

Furthermore, since most rotary attachments are manually adjusted, it is usually impossible to mill the work precisely in the first machining operation, and additional operations are needed for obtaining the requisite tolerances and dimensions in bores, slots, etc., in the article being machined.

It has been found, however, that if the cutter is attached by means of a ball and socket joint to the milling machine head, such as the head of a vertical spindle type milling machine, the aforesaid difficulties can be nullified. The cutter can be easily adjusted through an arc of 360° about the vertical centerline of the joint as well as at a plurality of different angles with respect to any vertical and any horizontal axial line drawn through the article being machined on the table of the milling device. In short, instead of there being but three freedoms of movement of the cutter per se with respect to the article being machined, it is possible to obtain movement of the cutter per se in five different directions, so that the cutter can be said to have five different freedoms of movement. As a result, it is possible to eliminate the use of complicated fittings and parts, such as special rotary attachments, swivel heads, etc., which have been used in the past and are affixed directly to the table upon which the work is placed, or to the machine when circulatory and/or angular motion of the cutter with respect to the work is desired.

In addition, the use of a ball and socket joint for attaching the cutter to the milling machine head facilitates controlling the movements of the cutting head and cutter electronically, so that after a pattern has been affixed and connected to the proper part of the milling machine, the cutter can then be accurately electronically controlled to follow the pattern during the machining of an article with a minimum amount of error. By use of the novel control means to be described more fully hereinafter, or any other suitable type of control means, the spindle and associated cutting tool may be moved during the cutting operation in any desired manner.

Accordingly, it is a primary object of this invention to provide a novel means for attaching the cutting device of a milling machine to the milling machine head.

It is a further object of this invention to provide novel means for attaching the cutting device of a milling machine to the milling machine head, whereby the cutting device can be accurately and minutely adjusted through an arc of 360° and at different angles with respect to any vertical and any horizontal axial line drawn through the article being machined.

It is a further object of this invention to provide a novel ball and socket joint between the head of a milling machine and the cutting device attached thereto.

It is a further object of this invention to provide a milling machine cutting element, which has vertical, lateral, angular, longitudinal, and circulatory movements.

It is another object of this invention to provide novel means for controlling in a ball and socket joint between a milling machine head and a cutter, the movements of the ball element within the socket.

Another object of this invention is to provide novel means including a ball and socket joint for attaching the cutting or work performing element of a vertical spindle type milling machine to the head of the milling machine.

Still another object of the invention is to provide novel means including a ball and socket joint and suitable controls whereby the vertical spindle of a milling machine may be moved to any position within the practical limits of the spindle mounting to enable the cutting tool to perform various and intricate operations during its stroke over the workpiece.

These and other objects are accomplished by providing in a milling machine head, such as the head of a vertical spindle type milling machine, the combination of a carrier member provided with an annular socket in the lower extremity thereof. A ball element is mounted within this annular socket, and a work performing member, such as a cutter, is attached to the outer periphery of the ball element. Suitable means, such as hydraulic motors, can be used for moving or rotating this ball element within the socket in a plurality of directions whereby the work performing member can be minutely adjusted through an arc of 360° and at a plurality of different angles with respect to any vertical and any horizontal axial line drawn through an article being machined.

These and other objects and advantages of the instant invention will become more apparent from a review of the following detailed description when taken in conjunction with the appended drawings, wherein:

Figure 1 is a front sectional view of the head of the improved vertical spindle type milling machine with the remaining portions of the milling machine being disclosed in outline form and with parts removed for the sake of clarity;

Figure 2 is a sectional view of the head of the milling machine shown in Figure 1 when viewed from the side thereof, with parts removed for the sake of clarity;

Figure 3 is a sectional view taken through the upper portion of the carrier element which forms part of the head of the milling machine of Figure 1; and Figure 4 is a plan view of the improved milling machine head of Figure 1 with other parts of the milling machine being shown in outline form.

Although the novel ball and socket means for attaching a cutter or work performing member to a milling machine will be described with particular reference to its use on a vertical spindle type of milling machine, it is to be understood that the same advantages attributable thereto may be also obtained by use of the ball and socket means in a similar manner on other types of vertical, as well as horizontal, milling machines.

With further reference to the drawings, and particularly Figures 1 and 2, the vertical spindle type milling machine with which the present invention is associated is generally comprised of a machine base 1. A work table 2 upon which the work is mounted is attached to the machine base 1. Suitable means, such as handwheels 9, may be used for regulating the longitudinal movements of the table in a manner well known in the art. Projecting upwardly from the machine base 1 is an upright member or column 3. The milling machine head element 6 is movably attached to the upper portion 4 of the column 3 by means of the bracket 5.

In an advantageous embodiment of the invention, this head element 6 includes a somewhat inverted pear-shaped carrier element 7, of decreasing annular cross-section from the top to the bottom thereof, which is provided with a hollow interior 8.

The bracket 5 which is used to suspend and attach the head element 6 of the milling machine to the column 3 thereof may be advantageously provided with vertical slide members or keys 10. Slide members or keys 10 are adapted to slide within the vertical keyways 12 located in the upper portion 4 of column 3. Thus, by means of the keys and keyways 10 and 12, movement of head element 6 vertically with respect to the work on table 2 can be brought about. In addition to making table 2 movable and for the purpose of obtaining maximum lateral or sideways movement of the head element 6 with respect to the work on table 2, the upper portion 4 of column 3 is attached to column 3 by means of the horizontal keys 11 on upper portion 4, which are slidable within keyways 13 in column 3. In order to move head element 6 upwardly or downwardly, or back and forth across the work, any suitable means may be used for operating keys 10 and 11 in keyways 12 and 13, which are well known in the art.

Thus far, the description of the vertical spindle type milling machine is that of a conventional milling machine. It will also be noted from the description thus far that any cutter or work performing member which would be attached to the head element 6 of the milling machine could be adjusted upwardly and downwardly, laterally or longitudinally with respect to the work. Any circulatory movement of the cutter with respect to the work would have to be accomplished by the use of a special rotary attachment affixed to the table 2, with the work in turn being anchored to this attachment. In the case of an angular adjustment of the cutter with respect to the work, a separate attachment would also be required.

Accordingly, in order to accomplish circulatory as well as angular movement of the cutting device per se, the preferred contemplation of the invention contemplates that the cutter or work performing member 14, which may consist of a tapered shank cutter, double end cutter, or any type of cutter which is generally employed with a milling machine, be attached to the carrier member 7 of head element 6 by means of a ball 16 and a horizontally disposed socket 17. Socket 17 is of annular and spherical configuration. Its dimensions conform to those of ball 16, and it is preferably located in the lower extremity of carrier element 7. Ball element 16 may be made an integral part of a spindle 18, located in the hollow interior 8 of carrier element 7, or it may be separately attached to the spindle 18. In either event, both the spindle 18 and ball 16 are preferably hollow so that they may house a main or central drive shaft 21. The upper extremity of this shaft is connected by suitable gears, shafts, etc. (not shown), to an electric motor 22, mounted upon the upper portion of the spindle 18. The lower extremity of shaft 21 is connected to a suitable coupling or chuck member 24, secured to the outer periphery of ball 16. The cutter 14 is affixed directly to member 24. The various gears, clutches, etc. (not shown) which are used to regulate the speed of shaft 21 and cutter 14 are also adapted to be conveniently housed within the hollow spindle 18, ball 16, and couplings 16' and 17'.

In order to properly install the ball 16 within the annular, spherical socket 17 of the carrier element 7, carrier element 7 may be advantageously made in the form of two segments or two identical castings joined together. These castings may be joined together as indicated in Figures 1 and 4 by means of the lugs 25 on the castings. These lugs are provided with suitable apertures 26, through which a bolt 27 may be thrust after these apertures have been aligned and after ball 16 has been inserted within the socket 17.

For the purposes of rotating ball 16 within the socket 17, so as to obtain circulatory movement and adjustment of cutter 14 with respect to the work on table 2, the preferred embodiment of the invention contemplates the use of an annular track 30 made up of two arcuate segments 30' welded or otherwise affixed to the top marginal edge of carrier element 7. This track may also be somewhat T-shaped in cross-section. A gear segment 31, provided with a T-shaped groove 31', is adapted to be movably attached and mounted upon the track 30 by fitting the track 30 within groove 31'. The teeth 32 of the gear segment are adapted to engage the teeth 33 of the pinion gear 34 mounted on a shaft 35. Shaft 35 is connected to a suitable hydraulic or electric motor 36 affixed to the outer peripheral portion of the carrier element 7. Suitable stops 36' are also provided adjacent the ends of this gear segment.

For the purpose of anchoring spindle 18 to gear segment 31, there is located on and adjacent each of the extremities of the gear segment a socket element 37. Suitably mounted within each socket element 37 is a ball 38. Each ball 38 is rigidly affixed to a separate piston rod 39, which is adapted to reciprocate within a hydraulic cylinder 40.

By referring to Figures 3 and 4, it will be noted that the opposing ends of the several cylinders 40 converge at the spindle 18 and are provided with ball elements 41 rigidly affixed thereto. These ball elements 41 are adapted to fit and be anchored within suitable socket members or grooves 42 in the casting 43, which is freely affixed by means of the pin 44 to the standard 45. Standard 45 in turn is attached to the motor casing 22' for the electric motor 22. Thus, the pistons 39 and cylinders 40 form a telescoping arm arrangement for securing spindle 18 to the gear segment 31.

Thus, when fluid is pumped into and out of the various hydraulic cylinder barrels 40, through the ports 60 and 61 therein, in any predetermined manner, ball 16 can be rotated within the socket 17 to any predetermined position. Correspondingly, cutter 14 can be adjusted to any angular setting and through an arc of 360° about the vertical centerline of the spindle.

Any suitable means may be employed for controlling the flow of fluid into or out of the cylinder barrels 40 so as to control the movement of the spindle 18, ball 16 and cutter 14.

Although the gear segment 31 is adapted to move only through an arc of 180°, since this is sufficient for the purposes of the instant invention, it is obvious that it could be made to move through a greater arc. While a hydraulic control means is illustrated, it is equally obvious that other types of control means could be advantageously used in place of the means disclosed.

The movements of pistons and cylinders 39 and 40 or other suitable control means and gear segment 31 can be synchronized or they can be controlled separately, depending on the results desired, so that the cutter element 14 per se can be adjusted at any conceivable angle with respect to the article being machined. The advantages of such an arrangement are obvious.

As a result of the proposed arrangement for attaching the cutter element 14 to the head element 6 and suspending the same above the work, the cutter 14 can be rotated in a full 360° circle or any part thereof about the vertical center line of the spindle 18. The spindle 18 in turn may be said to be pivoted about a local point in the center of the ball 16, and is guided by the socket 17 in the carrier element 7. Thus, the locus point of the cutter 14 will be governed by the length of the cutter from the local point representing the center of the ball 16 moved upwards or downwards along the vertical center line of the keyways 12.

By the use of this novel swivel arrangement for mounting the cutting element 14 on the head of a milling machine, a practical device is provided in machining complicated and intricate articles such as aircraft forgings, die blocks, etc. The use of such a ball and socket arrangement also makes it practicable to control the motion of the cutter element by electronic devices, which can be adjusted accurately so the error in machining articles can be minimized. It also eliminates the use of a rotatable or rotary attachment presently affixed to the work table of the machine which is used to rotate the work about the cutter element 14, or a separate angular attachment for a machine head.

In short, by the use of the novel ball and socket arrangement of the instant invention for attaching a cutter element 14 to a head 6 of the milling device, it is possible to rotate the cutter element through a 360° arc or complete circle or any part thereof, and to adjust the same at angles with respect to any vertical and any horizontal axial line drawn through the work.

In order to provide for smooth operation and rotation of the ball 16 within the socket 17, the ball can be ground and flash chromium plated to size in order to reduce friction and wear. The socket 17 is also provided with a suitable means such as an oil line 50 for supplying lubricating oil to the socket 17 under pressure at all times, thereby providing ease of movement and control of the ball within the socket 17 at all times. A suitable gasket 51 may also be located within an annular recess 52 in socket 17 to prevent seepage of oil from within the socket.

It is obvious that various changes and modifications may be made in the invention without departing from the spirit and scope thereof as defined by the appended claims, wherein what is claimed is:

1. In a milling machine, the combination of a head element, said head element including a carrier member provided with an annular socket, a work performing member movably attached to said carrier member, and means for attaching said work performing member to said carrier member, said means including a ball member movably mounted within the annular socket in said carrier member, and multiple control means operable simultaneously as well as individually for rotating the ball member in a plurality of directions within said socket prior to as well as during the stroke of the work performing member over a workpiece, whereby said work performing member can be adjusted at a plurality of angles with respect to any vertical as well as any horizontal axial line drawn through the said carrier member.

2. In a milling machine head of the type described, the combination of a carrier member provided with an annular socket at one extremity thereof, a ball element, part of which is mounted within the said socket, a work performing member removably affixed to said ball element, and multiple control means operable individually as well as simultaneously for moving said ball element and the work performing member affixed thereto with respect to said carrier member prior to as well as during the stroke of the work performing member over a workpiece, whereby said work performing member can be adjusted at a plurality of angles with respect to any vertical as well as any horizontal axial line drawn through the said carrier member.

3. In a milling machine head of the type described, the combination of a carrier member provided with an annular socket at one extremity thereof, a ball rotatably mounted within the said socket, means including a work performing member and drive means therefore carried by said ball, and hydraulic motor means connecting the carrier member and the ball for rotating said ball in said socket in a plurality of horizontal and vertical planes, whereby said work performing member can be adjusted through an arc of 360° and at a plurality of angles with respect to any vertical and any horizontal axial line drawn through the said carrier member prior to as well as during the stroke of the work performing member over a workpiece.

4. In a milling machine, the combination of a work table to which an article being machined is affixed, and a carrier element movable toward and away from the said table, said carrier element being provided with an annular socket at the extremity thereof which is located closest to the said table and the article affixed thereto, a ball element freely mounted within the said socket, means including a work performing member and drive means therefore carried by the said ball element, and multiple control means operable individually as well as simultaneously for rotating said ball element within said socket whereby the work performing member affixed to said ball element can be adjusted at a plurality of angles prior to as well as during its stroke over a workpiece with respect to any vertical and any horizontal axial line drawn through the article being machined.

5. In a milling machine device, the combination of a work table, a head member, said head member being provided with a hollow carrier element movable toward and away from said work table, said carrier element also being provided at the extremity thereof which is closest to said work table with an annular socket, a spindle mounted within said carrier element, a ball element affixed to one extremity of the spindle and rotatably mounted within said annular socket of the carrier element, drive means, a work performing member projecting from an exposed outer peripheral portion of said ball element, said drive means and said work performing members being carried by said ball and means for rotating said ball element within said socket prior to as well as during the passage of the work performing member over a workpiece, whereby the work performing member attached thereto can be adjusted through an arc of 360° and at a plurality of angles with respect to any vertical and any horizontal axial line drawn through an article being machined on the said table.

6. A milling machine comprising the combination of a work table, a head member located above and spaced from the said table, said head member including a hollow tapering carrier element movable toward and away from said work table, said carrier element also being provided with an annular socket at the extremity thereof which is closest to said work table, a spindle mounted within said carrier element, a ball element affixed to one extremity of said spindle and rotatably mounted within said annular socket of the carrier element, a cutting device removably affixed to an outer peripheral portion of said ball element and means for rotating said ball element within said socket in a plurality of directions whereby the cutting device attached thereto can be adjusted prior to as well as during the stroke of the work performing member over a workpiece at a plurality of different angles with respect to any vertical and any horizontal axial line drawn through the workpiece on the said table, said means including a plurality of angularly disposed telescoping arms, the opposite extremities of which are affixed respectively to the said spindle and to the said carrier element.

7. The combination defined in claim 6 including motor means affixed to the spindle for driving the cutter device.

8. A milling machine comprising the combination of a work table, a head member located in spaced relationship to the said table, said head member having a hollow carrier element movable toward and away from the work table, said carrier element also being provided with an annular socket at the extremity thereof which is closest to the said work table and track means at the other extremity thereof, a gear segment movable along said track means, a spindle mounted within said carrier element, a ball attached to one extremity of said spindle and rotatably mounted within said annular socket of the carrier element, a cutting device removably anchored to the outer periphery of said ball, and means for rotating said ball within said socket whereby the cutting device affixed thereto can be adjusted through an arc of 360° and at a plurality of different angles with respect to any vertical and any horizontal axial line drawn through an article being machined on the said table, said means including a plurality of angularly disposed telescoping arms, the opposite extremities of which are universally connected to the said spindle and to the gear segment movably mounted on the said carrier element.

9. The combination defined in claim 8 including motor means affixed to the spindle for driving the cutter device.

10. In a vertical milling machine, the combination of a work table, a head member located above and spaced from said table, said head member including an annular, hollow carrier element movable toward and away from the work table in a vertical as well as a horizontal plane, said carrier element also having an annular socket at the lower extremity thereof and track means affixed to the upper extremity thereof, a gear segment movable along said track means, a spindle mounted within said carrier element, the lower extremity of said spindle being provided with a ball element receivable within the annular socket of said carrier element, a cutting device removably attached to the outer periphery of said ball element, motor means on said spindle for driving said cutting device, and means including a plurality of telescoping arms angularly disposed with respect to each other and having their opposite extremities affixed to the spindle and to the said gear segment for rotating said ball element within said socket for adjusting the cutting device attached thereto through an arc of 360° and at a plurality of different angles with respect to any vertical and any horizontal axial line drawn through an article being machined on the said table.

11. The combination defined in claim 10 including ball and socket means for attaching said telescoping arms to said spindle and said gear segment.

References Cited in the file of this patent

UNITED STATES PATENTS

| | | |
|---|---|---|
| 114,229 | Thorne | Apr. 25, 1871 |
| 960,188 | Nichols | May 31, 1910 |
| 985,412 | Hattersley et al. | Feb. 28, 1911 |
| 1,469,121 | Stewart | Sept. 25, 1923 |
| 2,263,635 | Larsen | Nov. 25, 1941 |
| 2,424,031 | Heer | July 25, 1947 |
| 2,788,718 | Martellotti | Apr. 16, 1957 |

FOREIGN PATENTS

| | | |
|---|---|---|
| 28,016 | Great Britain | Dec. 2, 1910 |
| 482,364 | France | Mar. 16, 1917 |
| 513,166 | Belgium | Aug. 14, 1952 |